United States Patent Office 2,988,531
Patented June 13, 1961

2,988,531
VULCANIZATION OF BUTYL RUBBER WITH A 2,6-DIMETHYLOL-4-HYDROCARBON SUBSTITUTED PHENOL AND PHOSPHORUS PENTOXIDE
James V. Fusco, Westfield, and Samuel B. Robison, Roselle, N.J., assignors to Esso Research and Engineering Company, a corporation of Delaware
No Drawing. Filed Nov. 19, 1958, Ser. No. 774,838
2 Claims. (Cl. 260—43)

This invention relates to a process for promoting the reaction of butyl rubber with dimethylol phenols, as well as to the reaction products obtained thereby. More particularly it relates to a process of this nature using phosphorus oxides as the promoting agents.

The curing of butyl rubber with dimethyl phenols is known. It has been desired to render the vulcanization of butyl rubber with dimethylol phenols more convenient and more economical, by reducing the time and temperature necessary to attain a practical cure by this method.

It has now been found that the vulcanization of butyl rubber with dimethylol phenols is greatly accelerated by the presence of a small amount of a phosphorus oxide and excellent cures can be obtained in a considerably shorter time, or at a lower temperature, than would otherwise be possible. This is particularly surprising because previously it had been thought that Friedel-Crafts materials were the necessary accelerators.

Butyl rubber is essentially a vulcanizable rubbery hydrocarbon copolymer containing about 85 to 99.5 weight percent, preferably about 95 to 99.5 weight percent of a $C_4$ to $C_8$ isoolefin such as 2-methyl-1-butene, 3-methyl-1-butene, or especially isobutylene, the remainder being a $C_4$ to $C_{14}$ multiolefin, preferably a $C_4$ to $C_6$ conjugated diolefin such as butadiene, dimethyl butadiene, piperylene, or such multiolefins as vinyl fulvenes, cyclopentadiene, cyclohexadiene, or especially isoprene. The resulting rubbery copolymer has a Staudinger molecular weight of between about 20,000 to about 300,000, a mole unsaturation of between about 0.5 to 15.0, and an iodine number of about 0.5 to 50.0 (Wijs). The preparation of such a copolymer, known in the art as butyl rubber, is described in U.S. Patent 2,356,128 to Thomas et al. and also in other patents as well as in the literature.

The phosphorous oxide ($P_2O_5$) is utilized in an amount of from about 1 to 8 weight percent based on the butyl rubber.

The dimethylol phenol curing agents are known materials, and are typically made by reacting a para-substituted phenol having the two ortho positions unoccupied, with a considerable excess of formaldehyde, the molar ratio of formaldehyde to phenol typically being 2:1, in the presence of a strong alkaline catalyst, especially an alkali metal hydroxide. Typically the mixture of the phenol, formaldehyde and alkaline catalyst is heated at a suitable temperature, e.g. 25° to 100° C., whereby the formation of the methylol phenol, i.e., the para-substituted-2,6-dimethylol phenol, is effected. This material, which is a phenol dialcohol, can be isolated by acidification of the mixture and separation of the oily layer, which can then be partially polymerized to the resol stage by heating it at elevated temperature, say 75° to 175° C. This resol material has the advantage that it is more reactive with the butyl rubber than is the lower molecular weight material. Isolation of the phenol dialcohol can be omitted, in which case the reaction is carried past the monomer stage to the resol stage, whereupon the mixture is neutralized and water is removed to give the resol. The resols are commercially available resins, sold under such trade names as Amberol ST–137, and they are oil-soluble and heat-reactive; i.e., capable of being converted by heat to a cured state without any necessity for adding a formaldehyde-yielding curing agent, in contrast to the novolac type of phenolic resin, which is prepared in acid medium with a deficiency of formaldehyde and is permanently fusible and soluble unless a source of formaldehyde is added to advance the cure.

The phenol from which the dimethylol phenol is made generally has a hydrocarbon group in the position para to the phenolic hydroxyl, examples being alkyl groups—especially alkyl groups having from 3 to 20 carbon atoms, of which tertiary-butyl and t-octyl (alpha, gamma, gamma-tetramethyl-butyl) are especially preferred—cycloalkyl groups, aryl groups such as phenyl, and aralkyl groups such as benzyl and cumyl. Such inactive substituent in the para position serves to "block" this otherwise active position and prevent the formation of a trialcohol which would not serve the purposes of the invention.

Examples of suitable dimethylol phenols that can be used in the invention either in the polymeric or monomeric form are as follows:

2,6-dimethylol-4-methylphenol
2,6-dimethylol-4-t-butylphenol
2,6-dimethylol-4-t-octylphenol
2,6-dimethylol-4-dodecylphenol
2,6-dimethylol-4-phenylphenol
2,6-dimethylol-4-benzylphenol
2,6-dimethylol-4-(alpha, alpha-dimethylbenzyl) phenol
2,6-dimethylol-4-cyclohexylphenol Any of the foregoing materials may be used either in the monomeric form, or in the polymeric, resol form. Mixtures of the resinous polymeric dimethylol phenols with more or less low molecular weight or monomeric dimethylol phenols are also useful. The resinous dimethylol phenols are the preferred materials for use in the invention because they are more effective, and more convenient to use. For the sake of convenience and brevity, the term dimethylol phenol, or 2,6-dimethylol-4-hydrocarbon substituted phenol, will be used to refer to any of the monomeric or polymeric compounds, or to mixtures thereof, unless otherwise stated. The resol or polymeric so-called 2,6-dimethylol-4-hydrocarbon substituted phenol, is of course actually a limited self-condensation polymer of the monomeric 2,6-dimethylol-4-hydrocarbon substituted phenol. Such polymer is believed to be composed largely of molecules having at each end a phenolic nucleus providing a methylol group in each terminal ortho position; and in this sense the polymer itself is also a "2,6-" dimethylol material. These terminal methylol groups render the resol polymer heat-reactive, in contrast to the novolac type of resin.

The dimethyl phenol is utilized in an amount from 3 to 25 weight percent based on the butyl rubber.

In carrying out the invention, the butyl rubber dimethylol phenol, and any additional desired ingredients, may be mixed together according to the procedures ordinarily used in mixing rubber compounds, with the aid of the usual rubber mixing equipment, such as an internal mixer or roll mills. The vulcanizable mixture resulting from the foregoing ingredients may be fabricated into the desired form by the usual methods, such as calendering, extrusion, or molding, and subsequently vulcanized by heating, preferably while confined under pressure.

For the purpose of making such articles as curing bags or inner tubes, there is generally included in the mixture a quantity of a suitable reinforcing material, preferably carbon black. Although at least about 10 to 150 parts by weight of carbon black may be employed per 100 parts of the butyl rubber, it is generally preferred to use about 20 to 100 parts of black, most preferably about 30 to 60 parts. Other compounding ingredients, such as fillers, processing aids, etc., may be included in the mixture if desired.

The curing process of the invention is conveniently carried out at temperatures of 200° F. or higher, and preferably at temperatures in excess of 250° F., for periods of time ranging from about 5 minutes to 2 hours, the lower the temperature the longer the curing time, and vice versa, within the stated ranges. Elastic products having the properties of typical vulcanized rubbery materials are obtained. The most preferred vulcanizing temperatures are within the range of about 280° to 400° F.

This invention and its advantages will be better understood by reference to the following examples.

*Example 1*

To the following masterbatch:

| | |
|---|---|
| Butyl 217 | 100 |
| SRF black | 25 |
| HAF black | 25 |
| Stearic acid | 0.5 |
| | 150.5 | was added the following curatives:

| No | 1 | 2 |
|---|---|---|
| Amberol ST-137 | 10 | 10 |
| Zinc Oxide | 5 | 5 |
| Phosphorous Pentoxide | ---- | 5 |

Butyl 217 is an isobutylene-isoprene copolymer having about a 400,000 viscosity average molecular weight, about 1.8 mol percent unsaturates (Drastic Iodine Mercuric Acetate Method, Gallo & Weise, Ind. & Eng. Chemistry, vol. 40, 1277 (1948)), and a Mooney Viscosity at 212° F. between 60 and 70, usually about 67.

The Amberol ST-137 is a commercial phenolic resin of the dimethylol phenol class of about 6.4 weight percent methylol, and is believed to be made from about 1 mol of p-t-octyl phenol, 2 mols of formaldehyde and 1 mol of sodium hydroxide, the alkali being carefully neutralized after the condensation is complete. The compositions were cured 60 minutes at 307° F. to give the following vulcanizate properties:

| No | 1 | 2 |
|---|---|---|
| Stress-Strain: | | |
| 200% Modulus, p.s.i. | 200 | 525 |
| 300% Modulus, p.s.i. | 420 | 900 |
| Tensile, p.s.i. | 2,070 | 2,030 |
| Elongation, percent | 810 | 600 |
| Shore "A" Hardness | 53 | 55 |
| Tear, p.s.i. | 250 | 190 |

Goodrich Flexometer Data at 100° C. 0.25" Stroke, 32 cps. 89#/in.² Load—10 minutes

| | | |
|---|---|---|
| Percent Permanent Set | 24.1 | 7.6 |
| Percent Dynamic Drift | 5.4 | 2.0 |
| Temperature Rise, ° C. | 35 | 29 |
| Appearance | Sl. Porous | Excellent |

These data illustrate the advantage of the phosphorous oxide promoter. Higher low extension moduli were obtained with greatly improved flexometer properties. An increased state of cure for the given time and decreased fatigue was thus also demonstrated.

*Example 2*

Different masterbatches were prepared and tested as shown below.

Resin SP-1045 is a substituted phenol resin of about 9.2 weight percent methylol.

Butyl 325 has about a 340,000 vis. av. molecular weight; 2.3 mol percent unsaturation and a Mooney viscosity of 40–50.

| Compound No | 3 | 4 | 5 |
|---|---|---|---|
| Butyl-325 | 100 | 100 | 100 |
| MPC Black | 50 | 50 | 50 |
| Zinc stearate | 1 | 1 | 1 |
| Zinc oxide | 5 | 5 | 5 |
| Resin SP-1045 | 15 | 15 | 15 |
| Phosphorous Pentoxide | ---- | 0.5 | 3.0 |
| Stress-Strain Properties—Cured 60 min. at 307° F.: | | | |
| Modulus at 200%, p.s.i. | 150 | 130 | 250 |
| Modulus at 300%, p.s.i. | 200 | 190 | 410 |
| Tensile Strength, p.s.i. | 1,420 | 1,400 | 1,990 |
| Elongation, Percent | 1,040 | 1,070 | 860 |
| Aged 16 hours at 380° F.: | | | |
| Modulus at 100%, p.s.i. | 290 | 250 | 280 |
| Modulus at 200%, p.s.i. | ---- | ---- | 580 |
| Tensile Strength, p.s.i. | 550 | 470 | 830 |
| Elongation, Percent | 180 | 190 | 280 |

These data show that 0.5 pt. of $P_2O_5$ was ineffective but that with 3 pts. of $P_2O_5$ higher tensile strengths and better properties were obtained after exposure to a severe aging test.

The improved vulcanizates of the invention can be used to great advantage in making a variety of useful articles, such as curing bags of the various known kinds, either for new tires or for re-treading tires, as well as in making hose, belts, inner tubes, especially heavy service inner tubes, and pneumatic tires, especially tire treads and side walls, as well as other objects.

It is to be understood that this invention is not limited to the specific example which has been offered merely as an illustration and that modifications may be made without departing from the spirit of the invention.

What is claimed is:

1. A method of vulcanizing a rubbery copolymer of an isomonoolefin having from 4 to 8 carbon atoms with from 0.5 to 15% of a conjugated diolefin having from 4 to 14 carbon atoms comprising heating said rubbery copolymer at a temperature in the range of 280° to 400° F. for a time interval of from 5 to 120 minutes in admixture with from 3 to 25 wt. percent based on the copolymer of a 2,6-dimethylol-4-hydrocarbon substituted phenol and from 1 to 8 wt. percent based on the copolymer of $P_2O_5$.

2. The process of claim 1 in which the phenol is a condensation resin product of p-t-octyl phenol and formaldehyde.

References Cited in the file of this patent

UNITED STATES PATENTS 2,829,123    Tawney _____ Apr. 1, 1958

FOREIGN PATENTS 611,919    Great Britain _____ Nov. 5, 1958

OTHER REFERENCES

Yoshinaga: Chem. Ab. 1952, 3789c–g.